Figure 1:
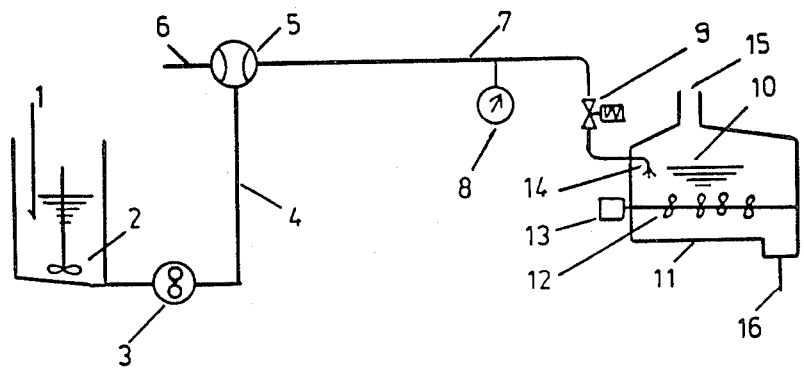

United States Patent [19]

Raboud et al.

[11] 4,349,579

[45] Sep. 14, 1982

[54] PROCESS FOR SOLUBILIZING COCOA

[75] Inventors: Pierre-Benoît Raboud, Monthey; Frantisék Kubicék, Bossonnens; Jean-Pierre Bandi, La Tour-de-Peilz, all of Switzerland

[73] Assignee: Societe d'Assistance Technique pour Produits Nestle S.A., Lausanne, Switzerland

[21] Appl. No.: 106,529

[22] Filed: Dec. 26, 1979

[30] Foreign Application Priority Data

Jan. 5, 1979 [CH] Switzerland .............................. 81/79

[51] Int. Cl.³ ............................................ A23G 1/00
[52] U.S. Cl. .................................... 426/631; 99/534; 426/447; 426/456
[58] Field of Search ............... 426/631, 445, 447, 448, 426/456, 465, 467, 519; 99/516, 534

[56] References Cited

U.S. PATENT DOCUMENTS 3,056,677 10/1962 Colten et al. .................... 426/631 X
3,754,928 8/1973 Haney ................................. 426/631
3,868,469 2/1975 Chalin ............................ 426/465 X Primary Examiner—Arthur L. Corbin
Attorney, Agent, or Firm—Vogt & O'Donnell

[57] ABSTRACT

A mixture of steam and a concentrated solution of an alkali carbonate are continuously injected under pressure into a cocoa mass in a tube, whereby the carbonate reacts with the cocoa mass under pressure in the tube at at least 120° C. to form a reacted mass mixture, which mixture is subjected to sudden expansion and then dried with stirring until a dried solubilized liquor is ultimately obtained.

11 Claims, 3 Drawing Figures

PROCESS FOR SOLUBILIZING COCOA

This invention relates to the production of soluble or alkalised cocoa. The subject of the invention is a process for solubilising or alkalising cocoa and an installation for carrying out this process.

The terms "solubilisation" and "soluble" are used hereinafter although they are less exact than "alkalisation" and "alkalised", because the treated cocoa powder does not dissolve, but instead disperses in the aqueous medium during preparation of the beverage.

Traditionally, the various phases involved in the production of soluble cocoa comprise cleaning and sorting of the raw nibs, roasting, crushing and degerming of the nibs (roasting may also be carried out after crushing), preliminary grinding as a result of which the cells are broken up and release cocoa butter, the product obtained representing the ground meal which is then solubilised, and the "liquor" obtained is converted into "pure paste" by fine grinding. The paste is taken to presses where a large part of the cocoa butter is separated, leaving the cakes. Finally, these cakes are ground and sieved to produce the powder. Sugar, vitamins, malt and lecithin are generally added to the powder thus obtained to form the end product from which the chocolate-flavoured beverage may be prepared using water or milk. The solubilisation phase is essential because, by transforming the starch, it enables the dispersibility of the cocoa to be increased by reducing its agglomeration and sedimentation. It is associated with the neutralisation of the acids responsible for the bitterness and with the formation of an attractive dark colour.

Several solubilisation processes have been proposed. In one method, the whole or crushed nibs are treated with ammonia before or during roasting. Ammonia has the disadvantage of being malodorous and extremely corrosive.

In another method working on the batch principle, the already dried powder is subjected to a treatment with steam under pressure in an autoclave, followed by rapid or "flash" expansion before it is mixed with the sugar. Although this process is rapid, it has the disadvantage of being a batch process and involves the risk of non-uniform treatment of the powder.

In a third method which is carried out continuously, the cakes, i.e. the paste from which most of the cocoa butter has been removed, are mixed with water and cooked in an extruder, the extrudate obtained being reduced into pellets which are then dried in a fluidised bed. With this process, it is only possible to treat cakes and, even then, only at low throughputs.

None of these processes is used in practice on account of the disadvantages by which they are attended.

On an industrial scale, the conventional solubilisation process comprises treating the paste at a temperature of from about 100° to 120° C. with an aqueous solution of an alkali, generally potassium or sodium carbonate, over a period of several hours, so that the reaction may take place, and drying the paste thus treated, the paste having a watercontent of approximately 1% on completion of the operation. Although the results obtained are satisfactory, numerous disadvantages remain: the process is a batch process, slow, expensive in terms of energy, requires large installations and involves numerous handling operations attended by risks from a hygiene point of view. To obtain a correct reaction between the paste and the alkali solution, the mixture has to contain approximately 25% of water which has to be eliminated during the treatment.

It has been found that it is possible considerably to improve solubilisation by working continuously with simple means which enable the hygiene risks to be eliminated and a much more favourable energy balance and a solubilised liquor of at least equal or even better quality, from the point of view of dispersibility, aroma and colour, to be obtained.

The process according to the invention is characterised in that steam and a concentrated solution of an alkali carbonate are continuously injected under pressure either separately or, preferably, in admixture into the cocoa mass in a tube, the carbonate is left to react with the cocoa mass under pressure in the tube at a temperature of at least 120° C., the mixture is subjected to sudden expansion and then dried while stirring until a dried solubilised liquor is ultimately obtained.

According to the invention, it is possible to treat the pre-dried or roasted and ground green meal, the pure paste obtained after fine grinding, the cakes after removal of the cocoa butter or a mixture of molasses and meal or pure paste. Accordingly, the term "cocoa" as used in the context of the invention relates to a mass to be treated consisting of one of these products.

However, it is preferred to treat the meal after roasting. The reactive steam-carbonate mixture is prepared by dispersing the carbonate, preferably potassium carbonate, in the form of a concentrated solution containing approximately 50% of carbonate in the flux of steam. The reactive mixture is preferably prepared by spraying the carbonate solution in fine droplets in countercurrent to a flux of saturating steam.

Alternatively, the carbonate solution may be mixed with the cocoa mass and the steam injected into the resulting mixture, although to obtain a better reaction, the reactants being ideally mixed, it is preferred to inject a dispersion of the carbonate solution into the steam. The ratio by weight of carbonate to cocoa is approximately 20 to 25°/··, whilst the ratio by weight of the carbonate-steam mixture to cocoa is from 6 to 15%. The quantities in which the reactants are used may vary according to the initial pH-value of the cocoa mass to be treated. They are adjusted to obtain a final pH of the liquor of from 6.8 to 7.5.

The cocoa mass tempered at 45° to 70° C. is circulated in a tube and the reactive mixture is injected under a steam pressure of from 8 to 12 atmospheres. The cocoa mass is subjected to intense turbulence and the temperature of the mass rises to approximately 130° C. The reaction takes place in the tube over a period of from 30 to 80 seconds, the reaction time being determined by the length of the dwell tube, the dwell tube being kept under an excess pressure of from 1 to 6 atmospheres and preferably from 2 to 5 atmospheres and at a temperature above 120° C. In the tube, the water content of the mixture is approximately 9 to 13% by weight.

After the reaction, the mass is subjected to sudden or flash expansion to atmospheric pressure or to a lower pressure, its temperature falling to between about 100° and 110° C. and its water content decreasing to between about 6 and 7%. It is dried with stirring for between 1 and 1.5 hours to a water content of approximately 1 to 1.5%.

The present invention also relates to an installation for carrying out the process which is characterised in that it comprises a unit for preparing a dispersion of concentrated alkali carbonate solution in the steam, a delivery tube for the cocoa mass, an injector for injecting the carbonate-steam mixture downstream of the dwell tube, a dwell or reaction tube equipped with means for maintaining a constant counter-pressure and a drying unit equipped with expansion means, stirring means, means for removing the steam and means for continuously discharging the solubilised liquor.

The accompanying drawing shows one example of embodiment of the installation according to the invention.

In the drawing,

FIG. 1 is a diagrammatic view of the installation.

Figure 2:
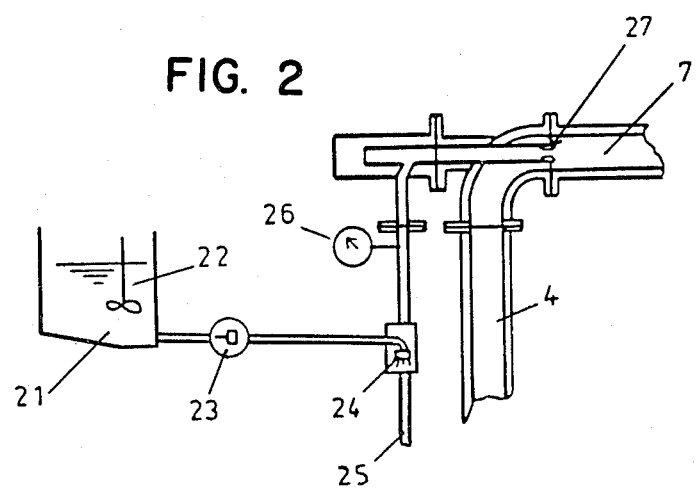

FIG. 2 diagrammatically illustrates the units for preparing and injecting the carbonate-steam mixture.

Figure 3:
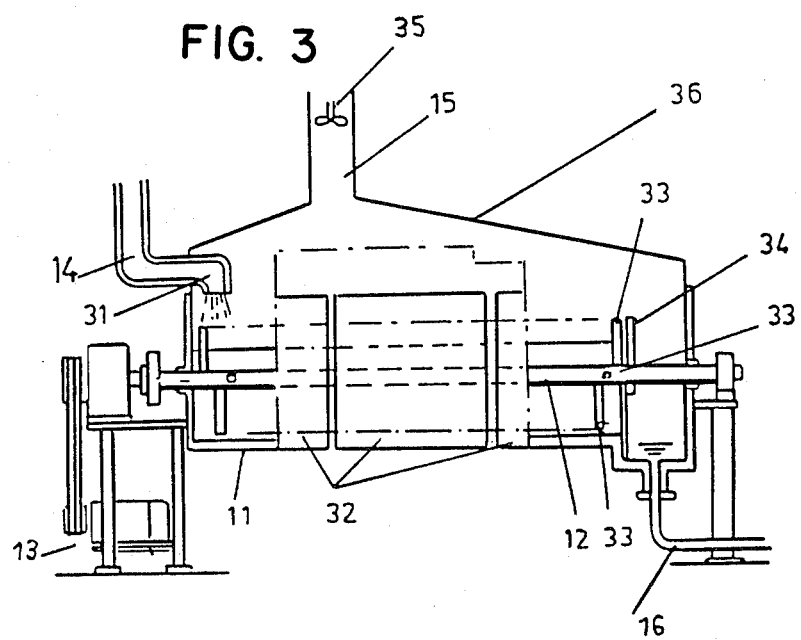

FIG. 3 diagrammatically illustrates the drying unit.

In the form illustrated in FIG. 1, the installation comprises:

a dwell tank 1 containing the cocoa and equipped with a stirrer 2;

a positive pump 3 feeding the tube 4;

a steam injector 5 with its tube for introducing the carbonate dispersion into the steam 6;

a dwell and reaction tube 7 downstream of the steam injector 5;

a manometer 8 controlling a valve 9 which, upstream, provides for a constant counter-pressure in the dwell tube 7 and, downstream, for expansion of the mixture;

a drying unit 10 which is formed by a closed tank 11 and mixing shafts 12 driven by a motor, into which opens the cocoa feed tube 14, to the top of which is connected a steam extraction pipe 15 and to the outlet of which is connected a discharge tube for the liquor 16.

In FIG. 2, the carbonate solution is prepared in the tank 21 equipped with its stirrer 22 and is then delivered by the metering pump 23 into an atomising chamber 24 in which it is sprayed into fine droplets in countercurrent to the steam arriving through the tube 25.

The reactive carbonate-steam mixture is injected under a pressure controlled by the manometer 26 into the nozzle 27 concentric with the cocoa feed tube 4, 7.

With the installation described above, it is possible to inject only that quantity of steam which is required to heat the cocoa mass to the required temperature through condensation by the product of all the steam injected. The heated fluid mass is extremely homogeneous by the time it leaves the injector. This guarantees optimal utilisation of the steam and remarkably stable reaction conditions. Referring back to FIG. 1, the dwell tube 7 is connected by the counter-pressure valve 9 to the expansion chamber formed by the drying unit 10. It is preferred to use a pressure of the steam ahead of the nozzle which is sufficiently high to benefit from all the advantages or the injector. This is because, under the law of critical flow as applied to a nozzle of the present type, the rate of flow of the steam at the nozzle exit reaches and no longer exceeds a limiting value, which is that of the speed of sound in the steam, from the moment when the pressure prevailing at the nozzle inlet exceeds approximately twice the pressure prevailing at the nozzle exit. The pressure prevailing in the dwell tube 7 is preferably kept at a value slightly above the saturated vapour pressure of water at the reaction temperature selected. Accordingly, the steam pressure prevailing at the nozzle inlet has to be distinctly higher than twice the pressure prevailing in the dwell tube so that the difference between the pressure prevailing at the nozzle exit and the pressure prevailing in the dwell tube cannot in practice be made up by accidental fluctuations in the pressure prevailing in the dwell tube. In this way, fluctuations such as these are unable to have any repercussions upstream of the nozzle and the rate of flow and temperature of the injected steam remain constant. The pressure under which the cocoa is injected through the tube 4 may be selected within the range defined by the pressure prevailing in the dwell tube 7 and the pressure prevailing at the nozzle exit.

In view of the fact that the process takes place under critical flow conditions, the throughput of steam per square millimeter of cross-section of the outlet passage of the nozzle is known from the moment when the value of the steam pressure prevailing at the nozzle inlet is fixed. Knowing the temperature at which and the rate at which the cocoa is introduced and the temperature to which it is desired to heat the cocoa to carry out the reaction, it is possible to calculate the exact quantity of steam required and, hence, the diameter of the nozzle to be used. Accordingly, there is no excess of steam and constant conditions prevail. This represents a major advantage of the process according to the invention because it is possible in this way to carry out the reaction under ideal conditions, the mixture being perfectly homogenised and the reaction taking place continuously at constant temperature and pressure, the reaction time being determined by the length of the dwell tube.

Since, in addition, a small quantity of water is introduced into the mass, a considerable saving of energy is obtained because the reaction takes place more quickly and because there is no excess water which would have to be evaporated during drying, as is the case in the conventional process. Thus, from a level of around 8 to 12% in the reaction tube, the moisture content falls to around 5 to 8% during expansion, leaving only about 4 to 6% to be eliminated during drying.

FIG. 3 is a diagrammatic view in section and partly in elevation of the drying unit. In the FIGURE, the mixture arrives after reaction through the tube 14 in which it undergoes expansion and pours into the tank through the opening 31. The tank 11 is equipped with double jackets 32 maintaining temperature zones (part shown in elevation). Several shafts 12 equipped with blades 33 enable the mass to be mixed. The shape of the tank and the arrangement of the shafts and blades are such that the cocoa, which arrives at 31, flows through the apparatus during the drying operation and then discharges into the tube 16 via the sliding flap 34. During the operation, the steam escaping from the mass is extracted by the chimney 15 equipped with a fan 35. The tank is equipped with an air-tight cover 36 and may be connected to a vacuum source by the chimney 15 when it is desired to work under a sub-atmospheric pressure.

The following Example shows how the invention may be carried out in practice. In this Example, all the precentages and parts quoted are by weight, unless otherwise indicated.

EXAMPLE 800 kg/hour of roasted meal are pumped from the tank 1 into the tube 4. A 50% potassium carbonate solution is prepared in the tank 21 and pumped by the metering pump 23 into the atomising chamber 24 at a rate of 300 ml/minute. The dry saturated steam is introduced through the tube 25 and the reactive mixture is injected into the tube 7 under a pressure of 8.5 atmospheres through the nozzle 27. In this tube 7, the reaction takes place in approximately 50 seconds at a temperature of 130° C. and under a pressure of from 3 to 5 atmospheres. The mass is suddenly expanded to atmospheric pressure and discharges into the drying unit 10. Its temperature then falls to approximately 100°–110° C. and its water content to between 6 and 7%. The drying unit fills, the flap 34 being adjusted to a level predetermined by the required throughflow. The mass circulates in the drying unit for about 1.5 hours. When the drying unit is full, the stationary regime is reached and the solubilised liquor, which has a final water content of from 1 to 1.5%, flows through the tube 11 at around 130° C. towards the crushers (not shown) to produce the fine pure paste intended for pressing.

We claim:
1. A process for solubilising cocoa which comprises:
   (a) continuously injecting, under pressure, a mixture consisting of steam and a concentrated solution of an alkali carbonate into a tube containing a cocoa mass;
   (b) allowing the carbonate to react with the cocoa mass under pressure in the tube at a temperature of at least 120° C. to form a reacted mass mixture within 30 to 80 seconds;
   (c) subjecting the reacted mass mixture to sudden expansion; and then
   (d) drying the expanded, reacted mass mixture while stirring until a dried, solubilised liquor is obtained.
2. The process of claim 1, wherein the admixture of steam and alkali carbonate is prepared by countercurrently spraying the carbonated solution in the form of fine droplets into a flux of saturated steam.
3. The process of claim 2, wherein the alkali carbonate is potassium carbonate.
4. The process of claim 1, wherein the cocoa mass is pre-dried or roasted and ground green meal, pure paste obtained after fine grinding, a mixture of molasses and meal or pure paste or paste, obtained after removal of cocoa butter.
5. The process of claim 1, wherein the cocoa mass is roasted and ground meal.
6. The process of claim 1, wherein the ratio by weight of the carbonate to the cocoa mass is approximately 20–25°/oo and the ratio by weight of the carbonatesteam mixture to the cocoa is approximately 6–15%, the respective amounts of carbonate and steam added to the cocoa mass being such that the solubilised liquor product obtained is at a pH of from 6.8 to 7.5.
7. The process of claim 1, wherein the cocoa mass is circulated in the tube at a temperature of 45 to 70° C. and a mixture of carbonate and steam is injected into the tube under a pressure of from 8 to 12 atmospheres.
8. The process of claim 1, wherein the tube is kept under an excess pressure of from 1 to 6 atmospheres and at a temperature above 120° C.
9. The process of claim 8, wherein the tube is kept under an excess pressure of from 2 to 5 atmospheres and at a temperature of about 130° C.
10. The process of claim 1, wherein the reaction mixture is subjected to expansion to atmospheric or sub-atmospheric pressure, its temperature falling to approximately 100°–110° C. and its water content falling to approximately 6–7%.
11. The process of claim 1, wherein after expansion, the mixture is dried from 1 to 1.5 hours to a water content of approximately 1–1.5%.

* * * * *

UNITED STATES PATENT AND TRADEMARK OFFICE
CERTIFICATE OF CORRECTION

PATENT NO. : 4,349,579

DATED : September 14, 1982

INVENTOR(S) : Pierre-Benoit Raboud et al.

It is certified that error appears in the above-identified patent and that said Letters Patent is hereby corrected as shown below:

Column 6, line 10, "carbonatesteam" should read --carbonate-steam--.

Signed and Sealed this

Twenty-sixth Day of July 1983.

[SEAL]

Attest:

GERALD J. MOSSINGHOFF

Attesting Officer

Commissioner of Patents and Trademarks